(12) United States Patent
Hansen

(10) Patent No.: US 12,234,159 B2
(45) Date of Patent: Feb. 25, 2025

(54) METHOD AND APPARATUS FOR RECYCLING WASTE WATER FROM A GROUTING PROCESS

(71) Applicant: Illinois Tool Works Inc., Glenview, IL (US)

(72) Inventor: Flemming Frost Hansen, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/703,001

(22) Filed: Mar. 24, 2022

(65) Prior Publication Data

US 2022/0315446 A1    Oct. 6, 2022

(30) Foreign Application Priority Data

Mar. 31, 2021    (EP) .................................. 21166475

(51) Int. Cl.
| | |
|---|---|
| *C02F 1/00* | (2023.01) |
| *B01D 21/00* | (2006.01) |
| *B01D 29/27* | (2006.01) |
| *C02F 9/00* | (2023.01) |
| *C02F 103/36* | (2006.01) |

(52) U.S. Cl.
CPC ............ *C02F 1/00* (2013.01); *B01D 21/0012* (2013.01); *B01D 21/003* (2013.01); *B01D 29/27* (2013.01); *C02F 1/004* (2013.01); *C02F 9/00* (2013.01); *C02F 2001/007* (2013.01); *C02F 2103/365* (2013.01); *C02F 2201/002* (2013.01)

(58) Field of Classification Search
CPC .... C02F 1/00; C02F 1/004; C02F 1/52; C02F 2001/007; C02F 2103/365; C02F 9/00; C02F 2201/008; C02F 2201/002; B01D 21/0012; B01D 21/003; B01D 21/02; B01D 229/27
See application file for complete search history.

(56) References Cited

U.S. PATENT DOCUMENTS

| | | | | |
|---|---|---|---|---|
| 3,839,749 | A | * 10/1974 | Blumenfeld | .......... E04H 4/1236 |
| | | | | 4/293 |
| 8,931,495 | B1 | 1/2015 | Abney, Sr. | |
| 10,633,962 | B2 | 4/2020 | Sund et al. | |

(Continued)

FOREIGN PATENT DOCUMENTS

| | | |
|---|---|---|
| CN | 106582074 A | 4/2017 |
| CN | 208161190 U | 11/2018 |

(Continued)

OTHER PUBLICATIONS

Office Action issued in corresponding UK Patent Appln. No. GB2203908.5, dated Aug. 26, 2022.

(Continued)

*Primary Examiner* — Liam Royce
(74) *Attorney, Agent, or Firm* — MaxGoLaw PLLC

(57) ABSTRACT

A method of recycling waste water from an offshore grouting process is provided. The method includes the steps of receiving waste water from a grouting equipment cleaning process, passing the waste water into a settling tank where sediment is separated from the waste water, removing water from the settling tank, and re-using the water removed from the settling tank.

8 Claims, 1 Drawing Sheet

(56) References Cited

U.S. PATENT DOCUMENTS

| | | | |
|---|---|---|---|
| 2007/0284312 A1 | 12/2007 | Lough | |
| 2008/0277335 A1* | 11/2008 | Allen | B01D 21/0003 |
| | | | 210/521 |
| 2013/0043196 A1 | 2/2013 | Ford | |
| 2018/0272256 A1* | 9/2018 | Bell | B01D 29/27 |
| 2019/0224592 A1* | 7/2019 | Meyer | C02F 11/122 |

FOREIGN PATENT DOCUMENTS

| | | |
|---|---|---|
| CN | 111517511 A | 8/2020 |
| CN | 112390409 A | 2/2021 |
| EP | 3208240 A1 | 8/2017 |
| GB | 2467005 A | 7/2010 |

OTHER PUBLICATIONS

Exam Report issued in corresponding EP Patent Appln. No. GB2203908.5, dated Apr. 30, 2024.

"Solutions for the Concrete Industry", Siltbuster Ltd., Monmouth, 2020. See pages relating to HD unit. Unit also shown in use in the YouTube (rtm) video httos://www.voutube.com/watch?v=fVxt74CL6oM.

\* cited by examiner

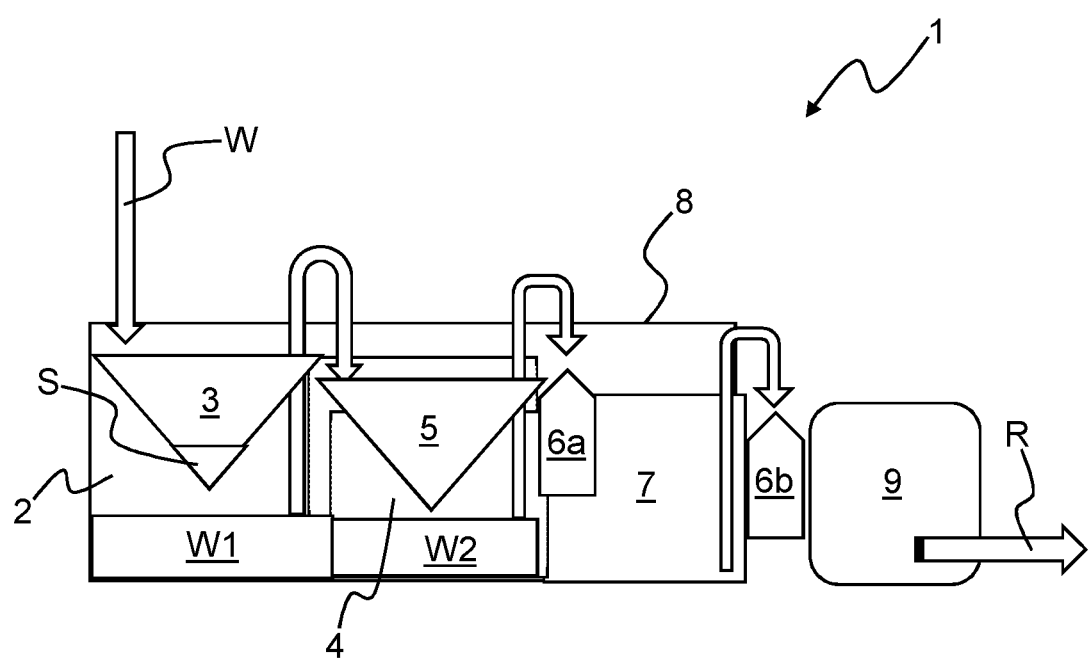

METHOD AND APPARATUS FOR RECYCLING WASTE WATER FROM A GROUTING PROCESS

RELATED APPLICATIONS

This application claims priority benefit of European Patent Application File No. EP 21166475.0 filed 31 Mar. 2021; the contents of which are hereby incorporated by reference.

TECHNICAL FIELD OF INVENTION

The invention relates to a method and apparatus for recycling waste water from a grouting process, in particular waste water from a grouting equipment cleaning process.

BACKGROUND

It has been found that providing a method and apparatus for recycling waste water from an offshore grouting process can reduce the operational cost and environmental impact of an offshore grouting operation.

It is therefore a first non-exclusive object of the invention to provide a method of recycling waste water, and an apparatus therefor, that overcomes, or at least mitigates, the known drawbacks of prior art grout cleaning processes.

SUMMARY

According to an aspect of the present invention, there is provided a method of recycling waste water from an offshore grouting process, the method comprising: receiving waste water from a grouting equipment cleaning process, passing the waste water into a settling tank where sediment is separated from the waste water, removing water from the settling tank, and re-using the water removed from the settling tank.

In some examples, the method may comprise transferring the waste water from the settling tank into a further settling tank. The method may comprise removing the water from the further settling tank, and re-using water removed from the further settling tank.

In some examples, the settling tank and/or the further settling tank may comprise a removable liner.

The removeable liner may be water permeable and configured to retain the sediment.

The method may comprise removing the removable liner from the settling tank and/or the further settling tank to remove the sediment from the settling tank and/or the further settling tank.

In some examples, the method comprises passing the water removed from the settling tank or further settling tank through a filter.

In some examples, the method comprises filtering a plasticizer from the waste water.

In some examples, re-using the water removed from the settling tank and/or further settling tank comprises re-using the water for cleaning grouting equipment and/or mixing grout.

According to a further aspect of the present invention, there is provided a water recycling apparatus for recycling waste water from an offshore grouting process, the apparatus comprising: a settling tank configured to receive waste water from a grouting equipment cleaning process; and a removable liner received within the settling tank, the removable liner being water permeable and configured to retain sediment; wherein the removable liner is removable from the settling tank to remove the sediment from the settling tank.

In some examples, the water recycling apparatus comprises a further settling tank having a further removable liner. The further settling tank may be arranged to receive water from the settling tank.

In some examples, the water recycling apparatus may comprise a pump configured to transfer water from the settling tank to the further settling tank.

In some examples, the water recycling apparatus may comprise a filter downstream of the settling tank or secondary settling tank arranged to filter water removed from the settling tank and/or further settling tank.

In some examples, the filter may be configured to filter plasticizer from the waste water.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Example embodiment(s) of the invention are illustrated in the accompanying drawings, in which:

FIG. 1 illustrates a schematic of a water recycling apparatus.

DESCRIPTION

Off-shore grouting, for example during installation of sub-sea structures, foundations and/or energy equipment, uses a grout material that is mixed with water and then transferred to the grouting site by grouting equipment including hoses, pumps and the like. At the grouting site the grout hardens or sets. Typically, the grout material is mixed with water on a vessel (ship) that carries the grouting equipment. After use the grouting equipment is cleaned to prevent build-up of hardened grout that may result in a blockage. Water and optionally cleaning chemicals are used to clean the grouting equipment. Waste water from such a grouting equipment cleaning process can be retained and returned to port for disposal as regulations prevent it from being disposed of in the sea. This often comes at a significant cost to the owner of the offshore structure.

Referring to FIG. 1, there is shown a water recycling apparatus 1 according to an exemplary embodiment. The water recycling apparatus 1 can be used on a vessel alongside grouting equipment for off-shore grouting, for example installing subsea structures such as foundations and jackets of wind turbines or oil and gas equipment. The water recycling apparatus 1 is useable to at least partially clean waste water from a grouting process, e.g. offshore grouting process, for example waste water from a grouting equipment cleaning process. The water output from the water recycling apparatus 1 can be re-used, for example for mixing grout or cleaning the grouting equipment.

Moving left to right along the apparatus of FIG. 1, the water recycling apparatus 1 includes a settling tank 2 having a removable liner 3 received therein. The settling tank 2 is configured to receive waste water W from a grouting equipment cleaning process. In the settling tank 2 the sediment from the waste water settles at the bottom of the removable liner 3.

The settling tank 2 is an open-topped vessel defining a volume in which the waste water is received.

The removable liner 3 is water-permeable and configured to retain the sediment. The removable liner 3 is removable from the settling tank 2 so as to remove sediment S and leave the water in the settling tank 2.

Arranged downstream and in series with the settling tank 2 is a second settling tank 4, having a second removable liner 5 received therein. The second removable liner 5 is water-permeable and configured to retain sediment so that removal of the second removable liner from the second settling tank 4 removes sediment and leaves water in the second settling tank 4.

Water is transferred from the settling tank 2 to the second settling tank 4 by a pump and pipe.

In the illustrated example, the removable liner 3 and second removable liner 5 are suspended within the settling tank 2 and further settling tank 4, respectively. The waste water W is passed through the removable liner 3 as it enters the settling tank 2, and the water passes through the second removable liner 5 as it is transferred into the second settling tank 4. Accordingly, filtered water accumulates at the bottom of the settling tank 2 and second settling tank 4. Water is transferred out of the settling tank 2 and the second settling tank 4 by a pipe and pump, where the pipe extends towards the bottom of the settling tank 2 or second settling tank 4.

In alternative examples the removable liner 3 and second removable liner 5 substantially conform to the inner volume of the settling tank 2 and second settling tank 5, respectively. Accordingly, sediment will settle towards the bottom of the settling tank 2 and second settling tank 4, and the water towards the top of the settling tank 2 and second settling tank 4 will have less sediment content. In such examples, the pipe and pump may be arranged to draw water from an upper part of the settling tank 2 and second settling tank 4. In such examples, removal of the removable liner 3 and second removable liner 5 leaves water in the settling tank 2 and second settling tank 4 while the sediment is removed.

In examples, the removable liner 3 and/or second removable liner 5 may comprise a filter bag, for example a geotextile bag or dewatering bag. The removable liner 3 and second removable liner 5 may comprise a polypropylene (e.g., non-woven polypropylene), or vented canvas. The removable liner 3 and second removable liner 5 are water permeable and configured to retain sediment. The removable liner 3 and second removable liner 5 may include one or more lifting handles for hoisting the removable liner 3 and second removable liner 5 and sediment out of the settling tank 2 and second settling tank 4.

In examples, the water recycling apparatus 1 may include a third settling tank, fourth settling tank, fifth settling tank, sixth settling or any suitable number of additional settling tanks, e.g. downstream of the second settling tank 4. The water recycling apparatus 1 may include up to six settling tanks, e.g. arranged in series. Each additional settling tank may be configured to operate in the same/a similar manner to the settling tank 2 and second settling tank 4. Each additional settling tank may have a respective removable liner, configured to operate in the same/a similar manner to the removable liner 3 and second removable liner 5. Such additional settling tanks may provide for removal or a higher proportion of the sediment from the waste water.

Downstream of the second settling tank 4 is a first filter 6a. The first filter 6a is arranged to filter water being removed from the second settling tank 4. In this example, the first filter 6a is configured to remove plasticizer from the water.

Downstream of the first filter 6a is a holding tank 7 for receiving water that has passed through first filter 6a.

In the present example, each of the settling tanks 2, 4 and the holding tank 7, together with the removable liners 3 and 5 and the first filter 6a, are located within a housing, for example a waste water skip 8 or intermodal container. Accordingly, the water recycling apparatus 1 can be easily installed and removed from the vessel and occupies only the footprint of the existing waste water skip.

Downstream of the holding tank 7 is a second filter 6b, for further contaminants and/or sediment from water. The second filter 6b is arranged to filter further contaminants and/or sediment from the water as it leaves the holding tank 7.

Downstream of the second filter 6b is a storage tank 9, in the form of an intermediate bulk container in this example. The water is stored within storage tank 9 for re-use R. The storage tank 9 may be movable. The storage tank 9 may be attachable to the water recycling apparatus 1 to refill with water and then movable to provide water for re-use R.

The water stored within the storage tank 9 can then be re-used R for mixing grout and/or cleaning grouting equipment. The water may be combined with clean/fresh water and optionally additionally materials (e.g., cleaning chemicals) to provide the required volume for re-use.

In some examples, only a degree of the sediment is removed from the wastewater, and in such examples the second settling tank 4, first filter 6a, and second filter 6b may be omitted. For example, if the water is re-used for cleaning grouting equipment then removal of aggregate and a portion of sediment may be sufficient. In another example, if the water is re-used for mixing grout then removal of aggregate and a portion of sediment may be sufficient. In some examples, removal of a higher proportion of sediment allows the water to be re-used for cleaning grouting equipment and/or mixing grout. In some examples, removal of at least a portion of the plasticiser from the waste water allows the water to be re-used for cleaning grouting equipment and/or mixing grout.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of recycling waste water from an offshore grouting process, the method comprising:
    receiving waste water from a grouting equipment cleaning process from the offshore grouting process on a ship or a floating vessel;
    passing the waste water from above into a removable liner having the shape of a cone to a first settling tank inner volume of a first settling tank on the ship or the floating vessel, the removable liner in the inner volume being water permeable, the removable liner retaining the sediment and where the sediment is separated from the waste water;
    removing in a single step the removable liner and the retained sediment from the first settling to obtain processed water;
    removing the processed water from the first settling tank;
    sequentially transferring the processed waste water from the first settling tank from above with a pump into at least one additional settling tank; and
    re-using the processed water removed from the first settling tank.

2. The method according to claim 1 wherein
    the at least one additional settling tank further comprising a separate removable liner that is water permeable in the inner volume of each of the at least one additional settling tank, each of the separate removable liners retaining additional sediment and providing for removal of a higher proportion of the sediment; and subsequently re-using the processed water removed from the at least one additional settling tank.

3. The method according to claim 2, further comprising passing the processed water removed from the first settling tank or the at least one additional settling tank through a filter.

4. The method according to claim 1, further comprising filtering a plasticizer from the waste water.

5. The method according to claim 2, wherein re-using the processed water removed from the first settling tank or the at least one additional settling tank comprises re-using the processed water for at least one of cleaning grouting equipment or mixing grout.

6. A method of recycling waste water from an offshore grouting process, the method comprising:
    receiving waste water from a grouting equipment cleaning process from the offshore grouting process on a ship or a floating vessel;
    passing the waste water from above into a removable liner having the shape of a cone that conforms to a first settling tank inner volume of a first settling tank on the ship or the floating vessel, the removable liner in the inner volume being water permeable, the removable liner retaining the sediment and where the sediment is separated from the waste water;
    removing in a single step the removable liner and the retained sediment from the first settling to obtain processed water;
    removing the processed water from the first settling tank;
    sequentially transferring the processed waste water from the first settling tank from above with a pump into at least one additional settling tank; and
    re-using the processed water removed from the first settling tank.

7. The method according to claim 2, wherein each of the separate removable liners conforms to the inner volume of each of the one or more additional settling tanks.

8. A method of recycling waste water from an offshore grouting process, the method comprising:
    receiving waste water from a grouting equipment cleaning process from the offshore grouting process on a ship or a floating vessel;
    passing the waste water from above into a first removable liner having the shape of a cone positioned across an open top of a first settling tank and within an inner volume of the first settling tank on the ship or the floating vessel, the first removable liner in the inner volume being water permeable, the first removable liner retaining a first sediment and where the first sediment is separated from the waste water to obtain once processed water within the first settling tank;
    removing the once processed water from the first settling tank and passing the once processed water from above with a pump into a second removable liner positioned across an open top of a second settling tank and within an inner volume of the second settling tank on the ship or the floating vessel, the second removable liner in the inner volume being water permeable, the second removable liner retaining a second sediment and where the second sediment is separated from the once processed water to obtain a twice processed water in the second settling tank;
    removing the retained first sediment from the first settling tank by removing the first removable liner from the first settling tank and removing the retained second sediment from the second settling tank by removing the second removable liner from the second settling tank;
    removing the twice processed water from the second settling tank; and
    re-using the twice processed water removed from the second settling tank.

* * * * *